Sept. 3, 1957   B. O. JACKSON   2,804,712
ELECTRIC CONTROLLED TROLLER
Filed May 27, 1955   3 Sheets-Sheet 1
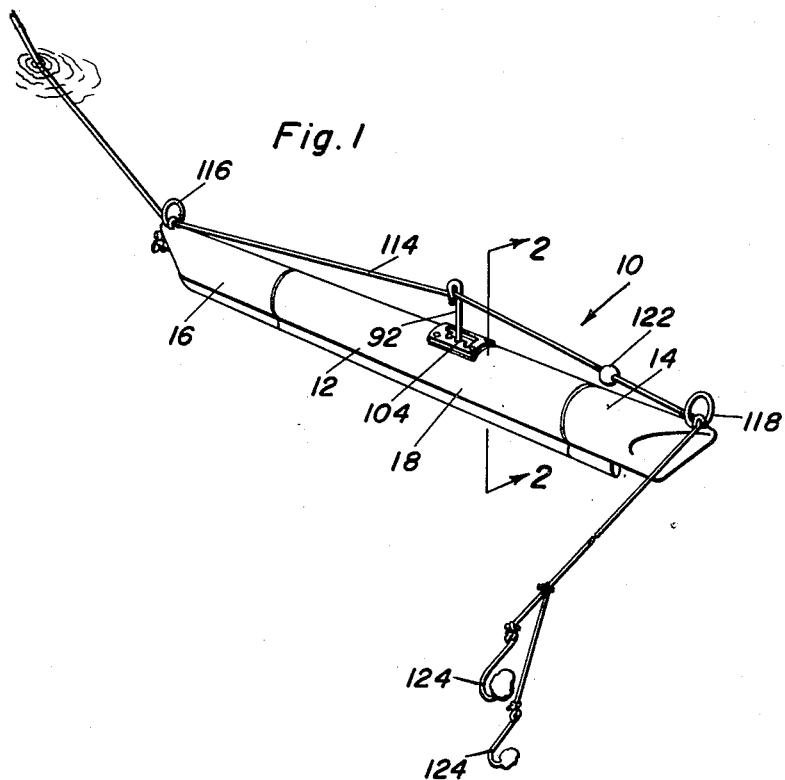
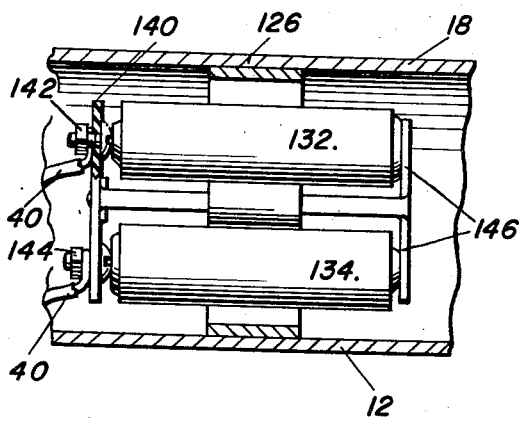
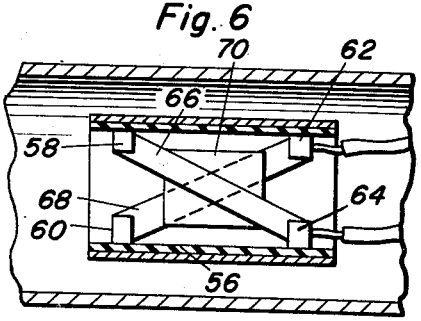
Bernard O. Jackson
INVENTOR.

Sept. 3, 1957
B. O. JACKSON
2,804,712
ELECTRIC CONTROLLED TROLLER
Filed May 27, 1955
3 Sheets-Sheet 2
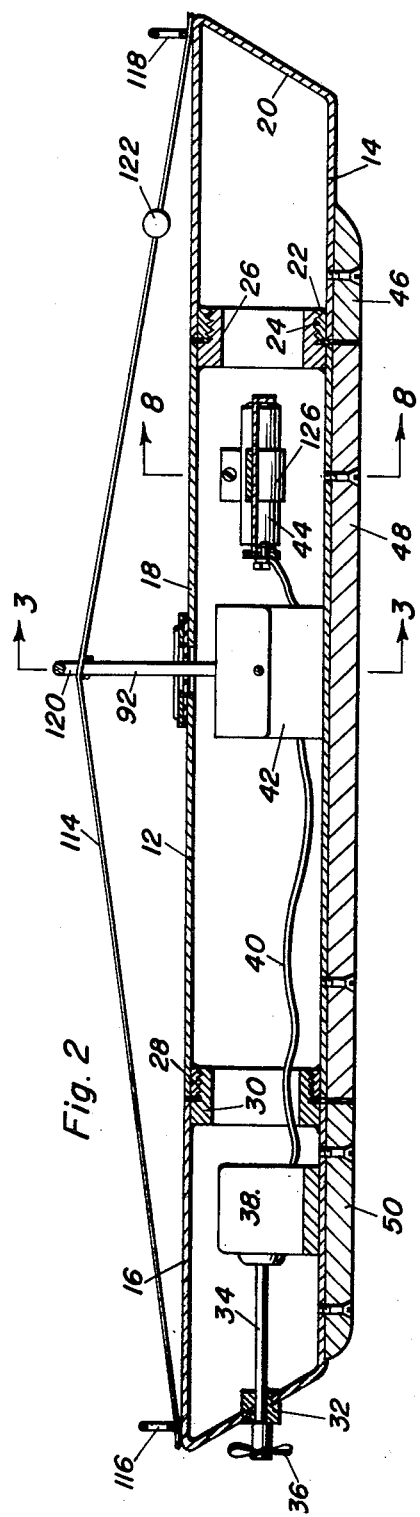
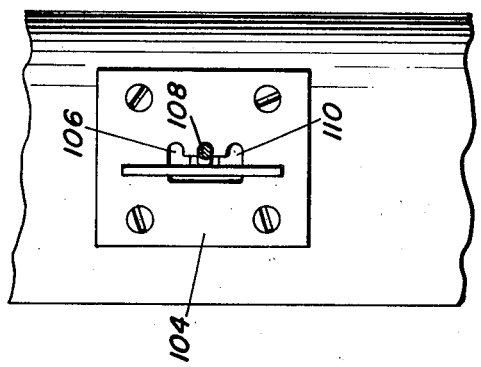
Bernard O. Jackson
INVENTOR.

Sept. 3, 1957     B. O. JACKSON     2,804,712
ELECTRIC CONTROLLED TROLLER
Filed May 27, 1955     3 Sheets-Sheet 3
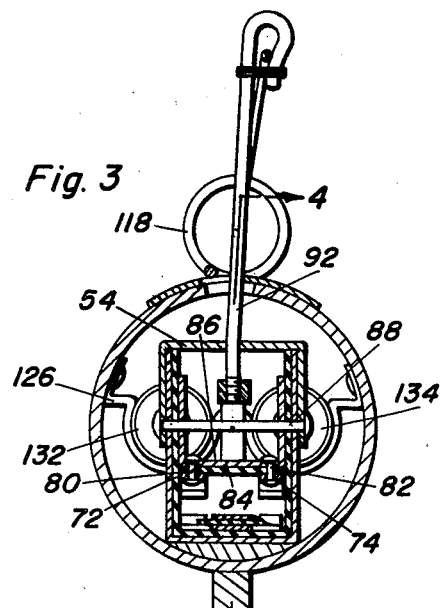
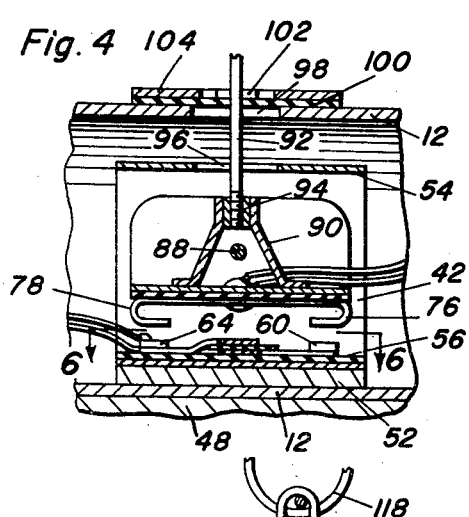
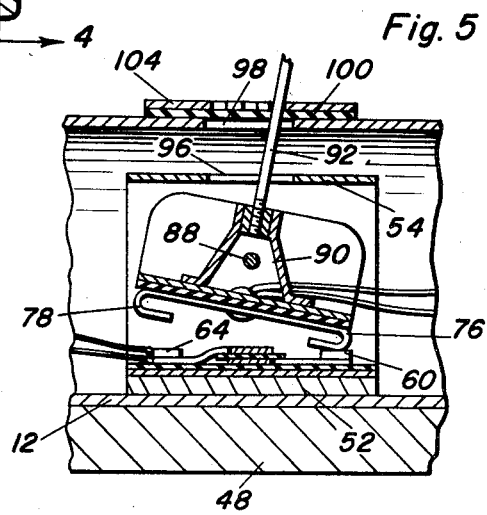
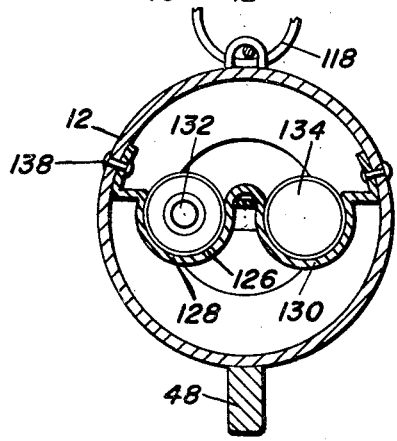
Bernard O. Jackson
INVENTOR.

United States Patent Office 2,804,712
Patented Sept. 3, 1957

2,804,712

ELECTRIC CONTROLLED TROLLER

Bernard O. Jackson, Butte, Mont.

Application May 27, 1955, Serial No. 511,692

2 Claims. (Cl. 43—26.1)

This invention relates to a fishing device, and to an electrically controlled troller or toy vessel which can be used in a novel manner for carrying a fishing line out to a suitable position.

The primary object of the present invention resides in the provision of a combination fishing device and electrically controlled troller or toy vessel which is adapted to be powered by suitable batteries mounted in the hull of the vessel and which has a novel switching arrangement whereby the operating lever of the switch simulates a periscope.

A further object of the invention resides in the provision of a fishing device which has means associated therewith for carrying the fishing line out to a suitable position where the bait may be suspended at a desired depth and includes self-propelled means for returning the fishing device from whence it first came.

An additional object of the invention resides in the provision of a novel arrangement of parts incorporated in a switching assembly whereby the polarity of a pair of batteries with respect to the reversible electric motor can be changed by operation of an operating lever by control of the fishing line, as may be desired.

Still further objects of the invention reside in the provision of a combined fishing device and toy vessel which can be alternatively used as a toy for its entertainment value, yet which may serve as a fishing device of novel characteristics.

These, together with the various ancillary objects and features of the invention which will become apparent as the following description proceeds, are attained by this electrically controlled troller or toy vessel, a preferred embodiment of which has been illustrated in the accompanying drawings, by way of example only, wherein:

Figure 1 is a perspective view of the troller or toy vessel;

Figure 2 is an enlarged vertical sectional view as taken along the plane of line 2—2 in Figure 1 and illustrating in particular the internal arrangements of the various component parts of the invention;

Figure 3 is an enlarged vertical sectional view as taken along the plane of line 3—3 in Figure 2;

Figure 4 is a sectional detail view as taken along the plane of line 4—4 in Figure 3 and illustrating in particular the construction of the switching arrangement when the switch is in a neutral position;

Figure 5 is a sectional detail view similar to that of Figure 4 but showing the switch in a reversed position;

Figure 6 is a horizontal sectional detail view as taken along the plane of line 6—6 in Figure 4;

Figure 7 is a plan view of a portion of the switch assembly;

Figure 8 is a sectional detail view as taken along the plane of line 8—8 in Figure 2; and Figure 9 is a plan view of the battery and battery support elements.

With continuing reference to the accompanying drawings wherein like reference numerals designate similar parts throughout the various views, and with initial attention directed to Figure 1, reference numeral 10 generally designates the electrically operated troller or toy vessel. This electrically operated troller or toy vessel includes a hull 12 formed of any suitable material, such as metal, plastics or the like, and includes a bow section 14, a stern section 16, and a midships section 18. As can be seen best in Figure 2, the bow section 14 is provided with a prow 20 and has an internally threaded ring 22 threaded, as at 24, for threaded engagement with an externally threaded cylindrical rib 26 of the midships section 18. The midships section 18 has an internally threaded ring 28 at its other end for threaded engagement with the externally threaded rib 30 of the stern section 16. The stern section 16 is provided with a gland or stuffing box 32 through which a shaft 34 extends, the shaft having a propeller 36 which may be formed of a bright and polished metal for the purpose of attracting fish to the bait to be carried by this combination toy and fishing device. An electric motor 38 is provided for powering the shaft 34 propeller 36 and is connected through suitable conductors 40 to a switch assembly 42 and thence to a suitable source of electrical current to be further described, but indicated by reference numeral 44.

The hull 12 may be provided with a suitable keel formed in sections, as at 46, 48 and 50, the keel sections being of suitable weight and secured by any convenient fastening means to the bottom of the shell of the hull 12.

The switch assembly 42 includes a mounting plate 52 secured to the hull 12. A casing 54 may be provided for the switching assembly 42, and the switching assembly includes an insulated base plate 56 on which pairs of contacts, see Figure 6, are mounted. These pairs of contacts are indicated by reference numerals 58, 60, 62 and 64. These contacts are connected by strips 66 and 68 in such a manner that the contacts 58 and 64 are interconnected while the contacts 60 and 62 are interconnected, the respective strips being insulated from each other by means of an insulated plate 70.

Engageable with the contacts 58, 60, 62 and 64 are a pair of contact strips, see Figure 3, indicated by reference numerals 72 and 74. The contact strips 72 and 74 have contacts which are indicated by reference numerals 76 and 78 for each of the strips 72 and 74. When the contacts 76 engage the contacts 58 and 60, the polarity will be in a first direction. However, when the contacts 78 engage the contacts 62 and 64, the polarity will be reversed, in the obvious manner. Contact strips 72 and 74 are riveted, or otherwise secured as by rivets 80 and 82, to a support 84, and are insulated from each other by the utilization of an insulative mounting member 86 of U-shape pivotally mounted, as at 88, for rocking movement. The pivot pin 88 also extends through the casing 54 and attached to the mounting member 86 is a suitable bracket 90 to which an operating lever 92 is threadedly attached, as at 94, the operating lever 92 extending upwardly through a slot 96 in the casing 54 and upwardly through an opening 98 in the hull 12 through a gasket 100 and through an opening 102 in a holding plate 104. The holding plate 104 is provided with a plurality of recesses 106, 108 and 110 defining the forward, neutral and intermediate positions of the switch and adapted to suitably lockingly hold the switch in one of the positions.

In operation, when the operating lever is engaged in the recess 106, it is so arranged that the contacts 58 and 60 will be engaged by the contact 76 to cause the motor 38 to rotate the shaft 36 so as to drive the device in a first direction. When the device is in the neutral recess 108, the contacts will not engage each other, as is shown in Figure 4. With the switch operating lever 92 engaged in the recess 110, the contacts 78 will engage the contacts 62 and 64 to cause the motor 38 to drive the shaft 34 and hence the propeller 36 in an opposite direction.

A fishing line 114 is threaded through eyes 116 and 118 on the hull and through an eye 120 on the operating lever 92. The operating lever 92 extending upwardly simulates a periscope. A float 122 of larger diameter than that of the eye 120 is provided for engaging the lever 92 when the fishing line 114 is pulled upon to thus actuate the operating lever 92. Hence, the user of the device need but set the operating lever 92 in a forward position and allow the screw 36 to drive the fishing device out to the desired distance. Then, an initial pull on the fishing line 114 will cause the float 122 to cause the lever 92 to disengage from the recess 106 and become engaged in the recess 108. This will cause the motor 38 to stop. A further yank on the fishing line 116 will cause the lever 92 to be actuated into the reverse position. The fishing line 114 may have suitable baited hooks 124 thereon so that the float 122 will serve to maintain the hooks 124 at a given depth.

Mounted within the hull 12 is a suitable battery carrier 126 which has semicylindrical portions 128 and 130 for receiving batteries 132 and 134. An insulative plate 140 is adajcent one end of the battery carrier 126 and carries terminals 142 and 144 to which the conductors 40 are attached after connection through the switch assembly 42. A bridging plate 146 is at the other end of the battery carrier 126 for connection of batteries 132 and 134 in series connection as shown best in Figure 9. The battery carrier 126 may be riveted or otherwise secured to the hull 12 as is best shown at 138.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A combination fishing device and toy vessel comprising a hollow hull, a shaft extending outwardly from said hull, a propeller on said shaft, a motor in said hull for driving said shaft, a source of electrical power in said hull, means electrically connecting said power source and motor including a switch, said switch having an operating lever extending upwardly above said hull and simulating a periscope, said lever including an eye, a fishing line extending through said eye, a float on said fishing line, said float being engageable with said lever to actuate said switch, and eyes on the bow and stern of said hull, said fishing line extending through eyes on said hull, said float being positioned between the eyes on said hull.

2. A combination fishing device and toy vessel comprising a hollow hull, a shaft extending outwardly from said hull, a propeller on said shaft, a motor in said hull for driving said shaft, a source of electrical power in said hull, means electrically connecting said power source and motor including a switch, said switch having an operating lever extending upwardly above said hull and simulating a periscope, said lever including an eye, a fishing line extending through said eye, a float on said fishing line, said float being engageable with said lever to actuate said switch, and eyes on the bow and stern of said hull, said fishing line extending through said eyes on said hull, said float being positioned between the eyes on said hull, said source of power being a pair of batteries, said motor being reversible, said switch being adapted to reverse polarity of said batteries with respect to said motor.

References Cited in the file of this patent

UNITED STATES PATENTS

| 1,271,272 | Bunkley | July 2, 1918 |
| 2,515,511 | Hansen | July 18, 1950 |
| 2,589,268 | Less | Mar. 18, 1952 |
| 2,709,316 | McCabe | May 31, 1955 |

FOREIGN PATENTS

| 231,031 | Switzerland | 1944 |
| 761,229 | France | 1934 |
| 833,916 | Germany | 1952 |